(12) United States Patent
Dauer

(10) Patent No.: US 11,377,279 B2
(45) Date of Patent: Jul. 5, 2022

(54) DAUER PACKAGING MATERIAL AND ASSEMBLY

(71) Applicant: Monte Philip Dauer, San Jose, CA (US)

(72) Inventor: Monte Philip Dauer, San Jose, CA (US)

( * ) Notice: Subject to any disclaimer, the term of this patent is extended or adjusted under 35 U.S.C. 154(b) by 0 days.

(21) Appl. No.: 16/991,953

(22) Filed: Aug. 12, 2020

(65) Prior Publication Data
US 2022/0048684 A1 Feb. 17, 2022

(51) Int. Cl.
| B32B 3/28 | (2006.01) |
| B65D 65/40 | (2006.01) |
| B32B 7/12 | (2006.01) |
| B32B 15/02 | (2006.01) |
| B32B 15/08 | (2006.01) |
| B32B 5/02 | (2006.01) |

(52) U.S. Cl.
CPC .............. *B65D 65/403* (2013.01); *B32B 3/28* (2013.01); *B32B 5/024* (2013.01); *B32B 7/12* (2013.01); *B32B 15/02* (2013.01); *B32B 15/08* (2013.01); *B32B 2250/04* (2013.01); *B32B 2307/542* (2013.01); *B32B 2553/00* (2013.01)

(58) Field of Classification Search
CPC ....... B32B 3/28; B32B 15/02; B32B 2553/00; B32B 3/266; B65D 65/00; B65D 65/38; B65D 65/40; B65D 65/403; E04C 2/18; E04C 2/26; E04C 2/30; E04C 2/32; E04C 2/322; E04C 2/34; E04C 2/3405; E04C 2002/3444; E04C 2002/345; E04C 2002/3455; E04C 2002/3461; E04C 2002/3466; E04C 2002/3472

USPC ................ 428/141, 152, 153, 154, 166, 167
See application file for complete search history.

(56) References Cited

U.S. PATENT DOCUMENTS

| 5,531,166 | A | 7/1996 | Woods et al. |
| 5,660,903 | A | 8/1997 | Andersen et al. |
| 9,434,136 | B1* | 9/2016 | Dauer ...................... B32B 7/12 |
| 2007/0048502 | A1* | 3/2007 | Kennedy ................. E04C 2/292 428/178 |
| 2007/0144111 | A1* | 6/2007 | Kennedy ................. B32B 15/20 52/783.17 |

(Continued)

FOREIGN PATENT DOCUMENTS

GB              980136 A    1/1965

OTHER PUBLICATIONS

McNatt, Basic Engineering Properties of Particle Board, 1973, US Dept of Agriculture, retrieved May 5, 2020 from https://www.fpl.fs.fed.us/documnts/fplrp/fplrp206.pdf (Year: 1973).*

(Continued)

*Primary Examiner* — Zachary M Davis
(74) *Attorney, Agent, or Firm* — IP Clinic at Lincoln Law School

(57) ABSTRACT

A packaging material and assembly are generally disclosed. In use, a multi-layered packaging comprises a first layer of corrugated material, a second layer, a third layer, a fourth layer, and a fifth layer of corrugated material. Additionally, a first bonding material bonds the second layer in between the first layer and the third layer, and a second bonding material bonds the fourth layer in between the third layer and the fifth layer.

17 Claims, 3 Drawing Sheets

(56) References Cited

U.S. PATENT DOCUMENTS

2013/0266772 A1\* 10/2013 Fujii ...................... B32B 21/13
428/178

OTHER PUBLICATIONS

Totten et al., Handbook of Residual Stress and Deformation of Steel, 2002, ASM International, p. 96 (Year: 2002).\*

\* cited by examiner

DAUER PACKAGING MATERIAL AND ASSEMBLY

FIELD OF THE INVENTION

The present invention generally relates to materials for encasing or protecting goods in transport, warehousing, or logistics, among others.

BACKGROUND

A wide variety of materials are available on the market for general packaging as well as for specialized packaging. A proper packaging is typically selected based on cost and level of desired protection. Common packaging used for transport or storage includes paper or plastic bag, shrink wrap, cardboard box, plywood, sheet of metal, plastic, etc.

Level of strength to weight ratio is a key criterium when selecting appropriate packaging for transporting, warehousing, or logistics.

SUMMARY

A packaging material and assembly are generally disclosed. In use, a multi-layered packaging comprises a first layer of corrugated material, a second layer, a third layer, a fourth layer, and a fifth layer of corrugated material. Additionally, a first bonding material bonds the second layer in between the first layer and the third layer, and a second bonding material bonds the fourth layer in between the third layer and the fifth layer.

DETAILED DESCRIPTION

Figure 1:
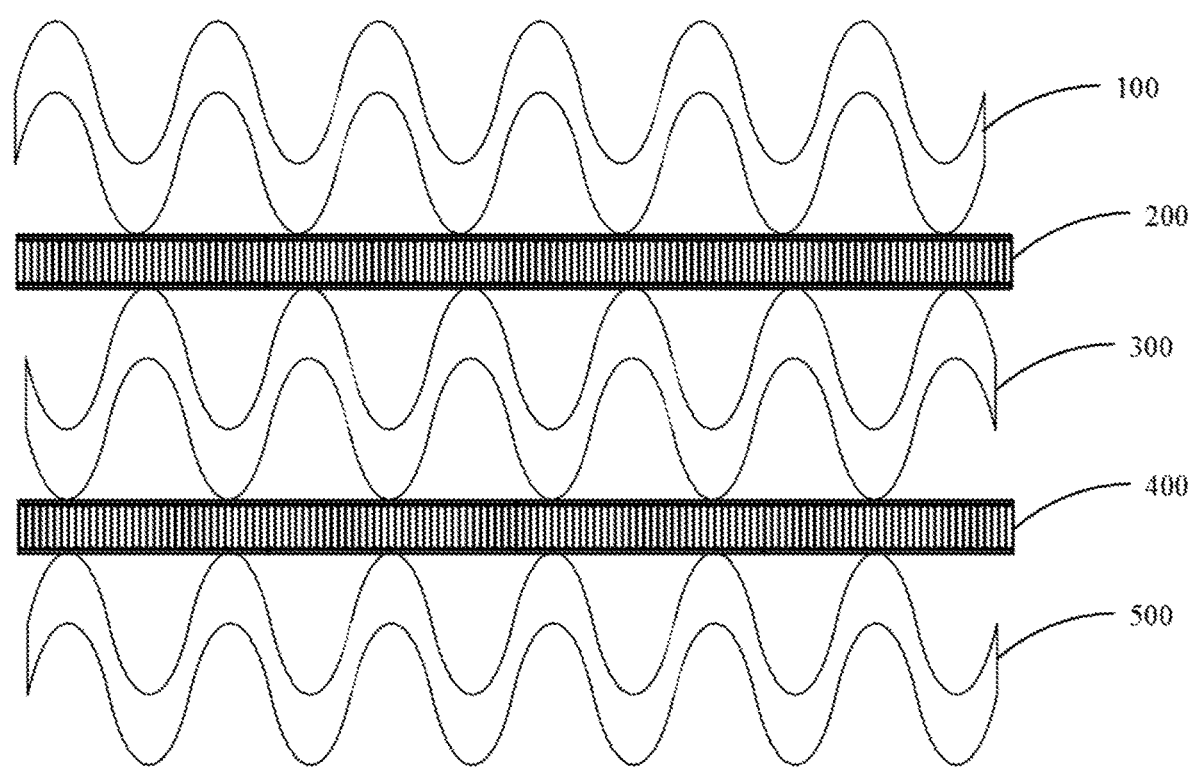
FIG. 1 illustrates a cross sectional view of a Strong Pac, in accordance with an embodiment.

Various embodiments herein describe Strong Pac. Strong Pac may be constructed in multiple layers to produce packaging of a desired thickness and strength as commonly used in the mailing, transportation, and logistics industry so as to conform to standard packaging practices. Strong Pac may be constructed in standard as well as unique shapes as required by the mailing, transportation, and logistics industry. Embodiments described herein alleviate the need for heavier wooden packaging.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

In an embodiment, a packaging material (also referred to herein as packaging) is constructed by laying a layer of a corrugated sheet of material, a wire mesh, another sheet of material, another wire mesh, another corrugated sheet of material, and applying glue, epoxy, or permanent or non-permanent binder between each sheet of material. Any number of layers may be added to in order to accomplish a desired thickness. Furthermore, any number of layers of wire mesh may be added to increase the strength of the Strong Pac as desired.

In an embodiment, once the desired thickness is achieved, Strong Pac may be subjected to high pressure and heat to completely bond all the layers and to cure the binder.

In an embodiment, an interlaced material may be used for some of the layers. In an example with five layers, the second (e.g. layer 200 of FIGS. 1-3) and fourth (e.g. layer 400 of FIGS. 1-3) layers may be an interlaced material and may include mesh fabric constructed of woven or welded metal to form an open grid by which the binder may freely flow. In another embodiment with five layers, the second and fourth layers may include any form of mesh, polyvinyl chloride (pvc), plastic, fabric, rods, individual wire(s), carbon fiber, fiberglass, metal sheeting, or perforated metal sheeting.

In an embodiment with five layers, a first (e.g., layer 100 of FIGS. 1-3), third (e.g., layer 300 of FIGS. 1-3), and fifth (e.g. layer 500 of FIGS. 1-3) layers include corrugated polypropylene sheets and the second and fourth layers include wire mesh.

In some embodiments, the shear modulus of the material comprising the second or the fourth layers is greater than the shear modulus of the material comprising the first, the third, or the fifth layers.

The following description of the embodiment(s) is merely exemplary (illustrative) in nature and is in no way intended to limit the invention, its application, or uses. Additionally, the invention may be practiced according to the claims without some or all of the illustrative information. Various embodiments employ multiple layers of corrugated sheets stacked in the same or alternating grain directions with wire mesh inserted between alternating layers and adhered or bonded to each other utilizing glue, epoxy, or other binders utilized in the bonding of corrugated and non-corrugated sheets. Desired thickness may be achieved by increasing the number of layers of corrugated sheets and non-corrugated sheets. Minimally one wire mesh sheet, sandwiched between one or more corrugated sheets with one more corrugated sheet to form the outer layer of the structure. All held together with glue on either side of the wire mesh.

FIG. 1 illustrates a cross sectional view of a Strong Pac, in accordance with an embodiment. For example, the Strong Pac comprises a corrugated layer 100, a wire mesh layer 200 with glue, epoxy, or other binder, a corrugated layer 300, another wire mesh layer 400 with glue, epoxy, or other binder, and another corrugated layer 500. This entire assembly is then subjected to a calculated amount of compression and heat to bond and cure the assembly and binder into a single congruent structure.

Figure 2:
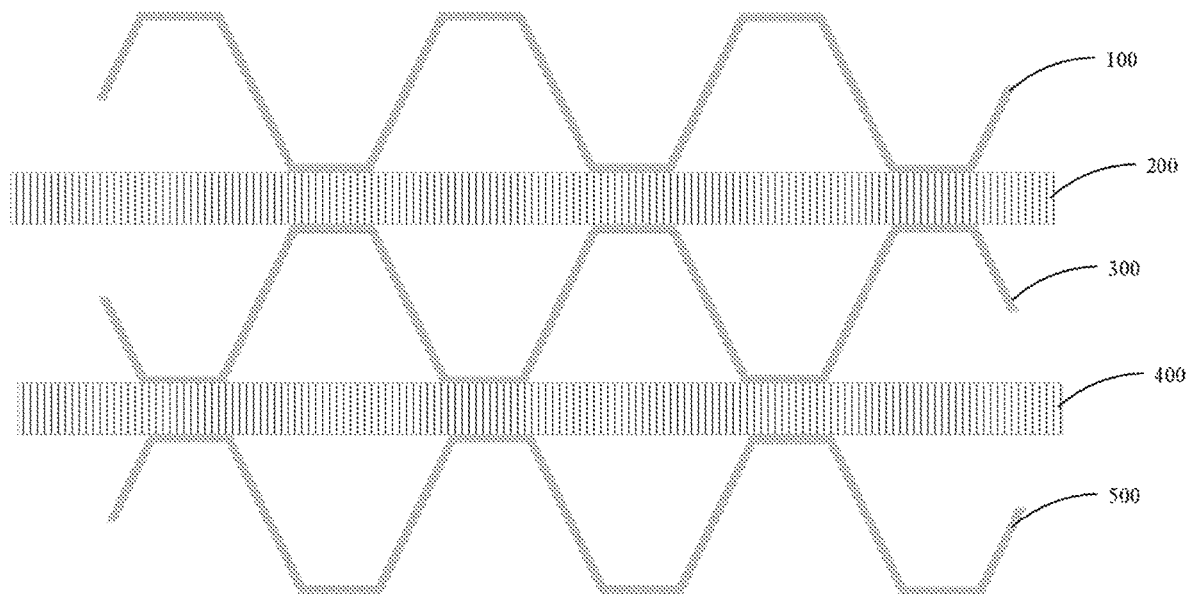
FIG. 2 illustrates a cross sectional view of a Strong Pac, in accordance with an embodiment.

FIG. 2 illustrates a cross sectional view of a Strong Pac, in accordance with an embodiment. For example, the Strong Pac comprises a corrugated plastic layer 100, a wire mesh layer 200 with glue, epoxy, or other binder, a corrugated plastic layer 300, another wire mesh layer 400 with glue, epoxy, or other binder, and another corrugated layer 500. This entire assembly is then subjected to a calculated amount of compression and heat to bond and cure the assembly and binder into a single congruent structure.

Figure 3:
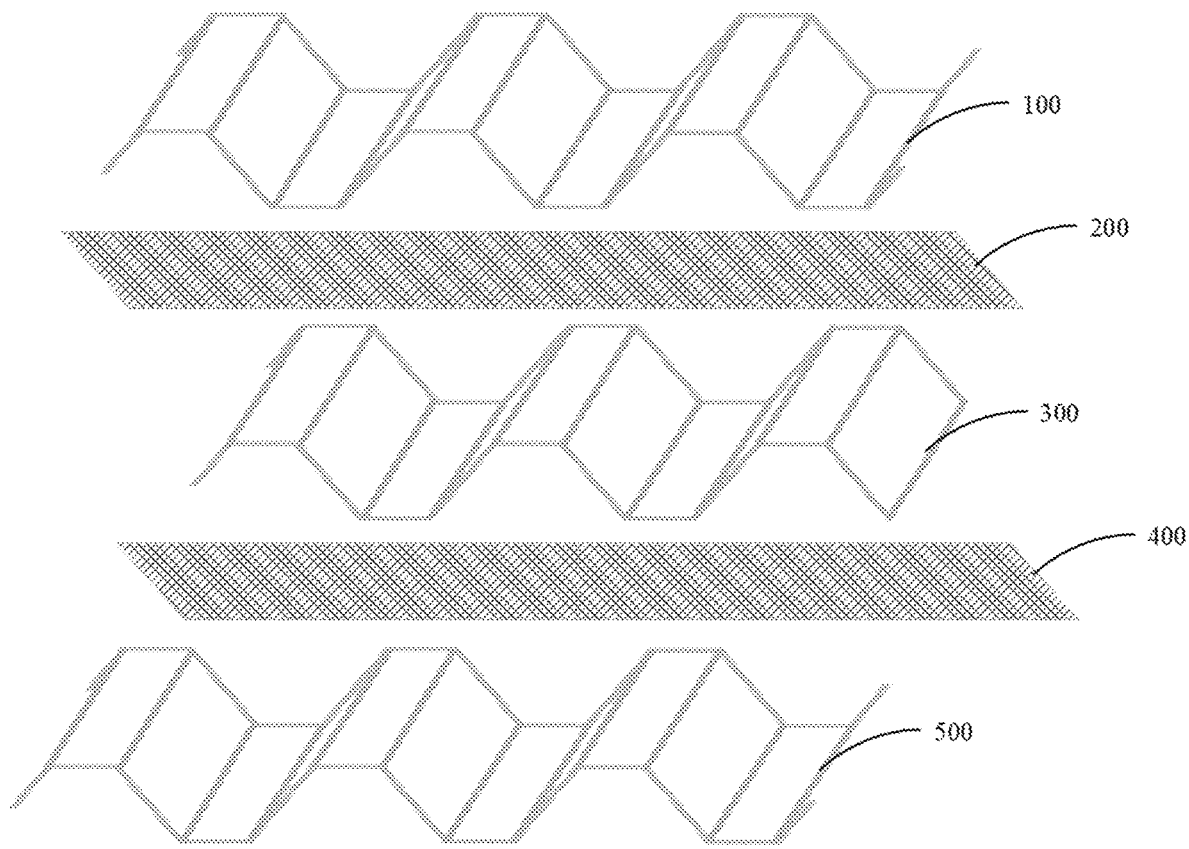
FIG. 3 illustrates an exploded view a Strong Pac, in accordance with an embodiment.

FIG. 3 illustrates an exploded view a Strong Pac, in accordance with an embodiment. For example, the Strong Pac comprises a corrugated plastic layer 100, a wire mesh layer 200 with glue, epoxy, or other binder, a corrugated plastic layer 300, another wire mesh layer 400 with glue, epoxy, or other binder, and another corrugated layer 500.

What is claimed is:

1. A multi-layered packaging comprising:
   a first layer of corrugated material;
   a second layer;
   a third layer;
   a fourth layer; and
   a fifth layer of corrugated material,
   wherein a first bonding material bonds the second layer in between the first layer and the third layer, and a second bonding material bonds the fourth layer in between the third layer and the fifth layer, and
   wherein at least one of the second layer, or the fourth layer is a mesh material;
   wherein at least two of the first layer, the third layer, or the fifth layer is a corrugated polypropylene sheet;
   wherein the shear modulus of the material comprising the second layer or the fourth layer is greater than the shear modulus of the material comprising the first layer, the third layer, or the fifth layer.

2. The packaging of claim 1, wherein the third layer is a corrugated material.

3. The packaging of claim 1, wherein the first, the third, or the fifth layers are cardboard, metal, polyvinyl chloride (pvc), plastic, composite, wood, laminate, pressed board, carbon fiber, or fiberglass.

4. The packaging of claim 1, wherein the first or the second bonding material are epoxy, glue, permanent binder, non-permanent binder, adhesive, or polystyrene.

5. The packaging of claim 1, wherein the second or the fourth layers comprise a porous material.

6. The packaging of claim 1, wherein the mesh material comprises at least one of: cardboard, metal, polyvinyl chloride (pvc), plastic, composite, wood, laminate, pressed board, carbon fiber, or fiberglass.

7. The packaging of claim 1, wherein the second or the fourth layers comprise a non-porous material.

8. The packaging of claim 7, wherein the non-porous material is metal, polyvinyl chloride (pvc), plastic, or fiberglass.

9. The packaging of claim 1, wherein the second layer and the fourth layer are formed of interlaced material.

10. The packaging of claim 9, wherein the interlaced material includes a mesh fabric constructed of woven or welded metal.

11. The packaging of claim 1, wherein the first, the third, and the fifth layers are substantially similar material.

12. The packaging of claim 1, wherein the second and the fourth layers are substantially similar material.

13. The packaging of claim 1, wherein the first bonding material and the second bonding material are substantially similar.

14. The packaging of claim 1, wherein the second and the fourth layers are corrugated material.

15. The packaging of claim 1, where at least one of the second layer or the fourth layer, comprises both a porous material and a non-porous material.

16. The packaging of claim 1, wherein the mesh material is a wire mesh.

17. The packaging of claim 1, wherein the mesh material is at least one of: polyvinyl chloride (pvc), plastic, fabric, rods, individual wire(s), carbon fiber, fiberglass, metal sheeting, or perforated metal sheeting.

* * * * *